INVENTOR.
JOHN A. VICTOREEN
BY
J. D. Douglass
HIS ATTORNEY

INVENTOR.
JOHN A. VICTOREEN
BY
J. D. Douglass
HIS ATTORNEY

INVENTOR.
JOHN A. VICTOREEN
BY
J. D. Douglass
HIS ATTORNEY

Patented June 17, 1952 2,600,817

UNITED STATES PATENT OFFICE 2,600,817

METHOD AND APPARATUS FOR PHOTO-ELECTRICALLY ASSORTING, RECORDING, OR COMPUTING

John A. Victoreen, Cleveland, Ohio, assignor to The Victoreen Instrument Company, Cleveland, Ohio Application December 10, 1945, Serial No. 634,038

12 Claims. (Cl. 235—61.11)

This invention relates to methods and apparatus for computing, sorting, classifying, adding or effecting other controls by the medium of intelligence placed on cards or sheets and more particularly to an improved method for accomplishing the foregoing photoelectrically.

Heretofore, it has been proposed to provide systems for recording of figures or intelligence on cards which contemplated punching the cards and utilizing electrical contacts which made contact through the punched openings to effect the desired operation. These prior devices and systems had the disadvantage that the paper stock had to be of a certain stiffness and the cards could not be wrinkled or folded, and subsequently properly operate the apparatus. They also required expensive and complicated apparatus to perform even the simplest of operations. It has also been proposed to provide characters on cards the percentage of opacity of which determined the sorting or selecting operations. All of the prior devices had certain deficiencies which were mainly the lack of versatility and the necessity of complicated cooperating mechanism to effect the desired end.

By my present invention, I have provided a system which is greatly simplified over that of the prior art and wherein the mechanism is relatively simple in construction and operation. It is possible to carry out my method without the need for special paper stock or punching operations. The system also adapts itself readily to use with standard business forms. It is also possible to achieve a higher speed in the operations than was heretofore possible.

Another advantage of this invention resides in the fact that the card bearing the intelligence may be moved through the scanner at varying speeds and that the removal of the intelligence from the card is independent of the speed; that is, the card may even be moved through at an irregular speed, the only requirement being that it does not back up appreciably during the progress through the scanner. For instance, the card could be stopped half way through the scanner without affecting the operation.

Another advantage resides in the fact that the marking on the card may take various forms; that is, the marking on the cards may be widely or closely spaced depending upon the particular use to which the invention is adapted. It will also be apparent that the manual marking can also take varied forms.

Still other advantages of the invention, and the invention itself, will become more apparent from the following description of an embodiment thereof, which description is illustrated by the accompanying drawings and forms a part of this specification.

Preferably, my invention includes a scanning system adapted to scan certain intelligence on a card, blank or any of the forms which are used to conduct a business. The article being scanned is provided with one set of markings which start and stop a counting operation, and the counting operation is performed by another set of markings.

In one form of the invention, the record card is provided with a predetermined number of permanent lines each of which may be representative of a digit in a number system or a letter of the alphabet. Although hereinafter I will refer principally to numbers, it will be appreciated that the alphabet can be substituted without departing from the spirit or scope of the invention. For all practical purposes, these lines could also represent divisions or classes as well as numbers or letters. The card is adapted to be marked with a cooperating marking to indicate certain of the digits to be selected. Scanning means is provided which scans the permanent lines as well as the cooperating marks to provide a series of impulses which cause the intelligence carried by the card to either be removed therefrom for utilization or to cause a further operation to be performed.

The invention will be described in connection with a simplified application, but it will be appreciated that the description of the specific application is for the purpose of clarifying the invention and not included as a specific limitation. I will assume that it is desirable to have a card which contains some intelligence in the form of a number, which number is desired to be placed onto an indicator. The particular number to be selected is 6,543.

Figure 4:
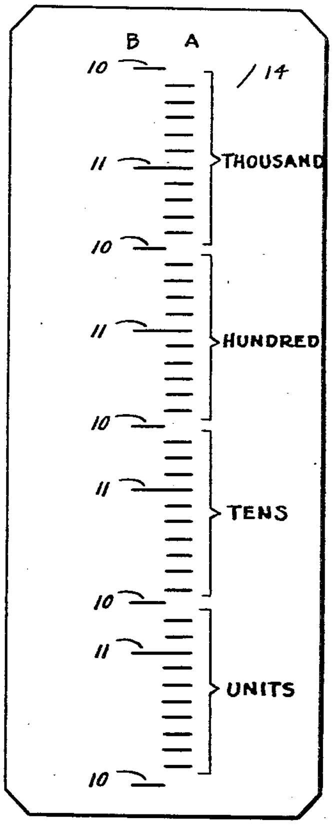
Fig. 4 is a view of a card which is useful in controlling the system of my invention.

More specifically, one form of my invention contemplates the use of a card such as is shown in Fig. 4 upon which is arranged groups of vertically spaced lines. The lines in column A I will call "digit lines," and the lines in column B "control lines." It will be noted that in column A there are four sets of lines, the first set at the top being "thousands" lines; the second set "hundreds" lines; the third set "tens" lines, and the fourth set "units" lines. It will be appreciated that there may be more sets of lines than indicated when it is desired to record or operate with figures having more than four digits.

Each of the lines in each group starting from the top and reading downward is representative of a consecutive number. In the bottom set, for instance, the first line represents "1," the second "2," the third "3," and so on to the tenth line which represents "0." In the "tens" group, the lines represent "10," "20," 30," etc.; in the third group the lines represent "100," "200," "300," etc., and in the fourth group the lines represent "1000," "2000," "3000," etc. It will also be appreciated that the order of the groups may be reversed if desired; that is, the units group may be at the top of the card.

The lines in the B column are the control lines; the first line 10 is a starting line; the second line 11 is a stopping line, and likewise throughout the remainder of the group.

Briefly, the starting line in column B causes the setting of the apparatus so that the digits are counted in column A; that is, the line 10 which may also be a permanent line causes the apparatus to be set so that the lines in column A will register when scanned. It will be noted that the indicator line 11, which may be placed on the card manually, may be and in this case is a prolongation of the sixth line in column A, which line is extended over into the B column to form the line 11. Then, since the line 10 sets up the apparatus, the lines in column A will cause the apparatus to count six digits in the thousands column at which time the line 11 will lock out the counter for the thousands group. Likewise, the same can be said of the following groups, and the total marking in this instance is effective to set up the numbers 6,543. As the description proceeds, the manner in which this is effected will become more clear.

Figure 1:
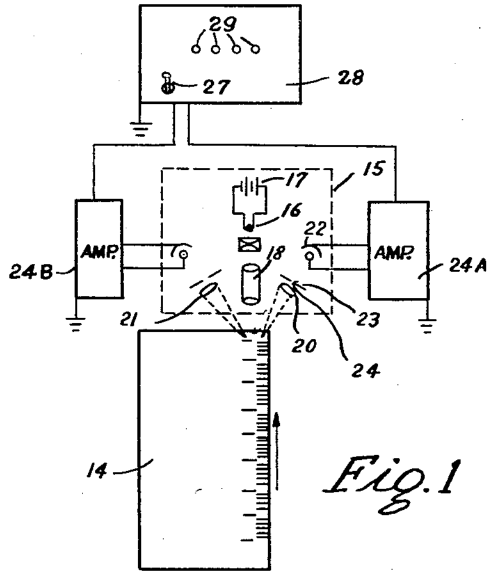
Fig. 1 is a schematic view of an apparatus embodying my invention.

In Fig. 1, I have shown schematically a scanning head 15 which is adapted to scan a card 14 such as has just been described.

The scanning head includes a light source 16 powered by a battery 17, the rays of lights being formed into a beam by the lens system 18 and which beam is directed onto the card 14 to illuminate the lines in columns A and 8.

The system contemplates providing a relative movement between the card and the scanning head. This may be effected by moving the card past the scanning head or by moving the scanning head over the card. I have found that preferably the cards may be moved continuously past the scanning head and provide a very efficient operation.

The beam of light falls upon the card and illuminates the marking thereon. It will be understood that the light is absorbed where the marks are located and reflected from the unmarked portions of the cards. It is desirable that the light upon the card strike it at such an angle that the angle of incidence and angle of reflection are unequal, to thus prevent the picking up of specular reflection from the black marks.

Preferably, two separate means are provided for sensing the marks, each including a lens system 20 and 21, one of which "looks" at column A and the other at column B. The lens system focuses an image of whatever is within its range from the card into a photo-electrical tube 22. A mask 23 is interposed between the lens system 20 and the photo-electric tube, which mask has an aperture 24 preferably in the form of a slot. By properly proportioning the aperture 24 and positioning the lens 20, the light reflected into the tube can be substantially completely shut off when a black line is being scanned, thus giving a very complete differentiation between the black lines and the white spaces during scanning.

The operation of the photo-electric tube is well known to those versed in the art and will not be discussed herein except to point out that when light strikes the elements, the tube becomes conducting; and that the output of the cell is a function of the light falling on the elements. At this point, it should be noted that although I have stated that the element 22 is a photo-electric tube, it is quite within the purview of my invention to utilize any light responsive device; for instance, the so called photo-voltaic cell could be substituted and operate in a highly efficient manner. Furthermore, to provide more complete discrimination between the black and white portions, I may also insert the light polarized filters in the proper places as is well known to those versed in the art.

The output from each of the cells is connected to and amplified in a suitable amplifier 24*a* and 24*b*.

It will be noted that the output of the cells will constitute a current which is interrupted each time the cell scans a black line. This, as is well known to those versed in the art, can be changed in the amplifiers to cause an increase in voltage, or current, each time a black line is scanned. In other words, the scanning system may be used to generate a pulse of current each time it scans a black line.

The amplifiers 24*a* and 24*b* could be and are preferably such that a pulse from either of the scanners will trigger the amplifier circuit to provide a pulse of sufficient duration to allow the realys to operate. In this instance, the scanner which scans column A will generate a series of pulses representative of the digits from 1 to 0. and the scanner which scans column B will provide a starting pulse and a coincidence pulse for any desired one of the digits in any one of the groups of lines.

It will be be appreciated that the scanning system of my invention together with the cooperating card and its intelligence thereon may be utilized in many and various combinations. A card marked as described may be used to select, classify, sort or compute, depending upon the apparatus used in conjunction therewith.

By way of illustration, I have shown a system where it is desired to take certain numbers off of the cards and have these numbers indicated on a register, this being perhaps one of the simpler uses for the system. To begin with, the card may be provided with the permanent markings as shown in column A of Fig. 4. If desired, the lines can be, and probably in practice would be, numbered or lettered. The operator in preparing the card for use merely extends the lines representative of the number desired into column B. This can be quickly and easily done either with a pencil, ink, or crayon. The card so marked, as in Fig. 4, is representative of the number 6,543. The manual marking does not necessarily have to be in exact coincidence with the permanent lines but only reasonably close thereto. The card after being marked is then moved under the scanner. Here again the system of my invention shows its versatility. The card does not have to pass under the scanner at any predetermined or constant speed. The only requisite is that it pass under without backing up. It can stop in its travel without effecting the operation, or one portion can travel through at a higher rate of speed than another portion.

Still another feature is that the marking can be placed in any desired position on the card such as along one edge if desired, preferably the position should be uniform.

Figure 2:
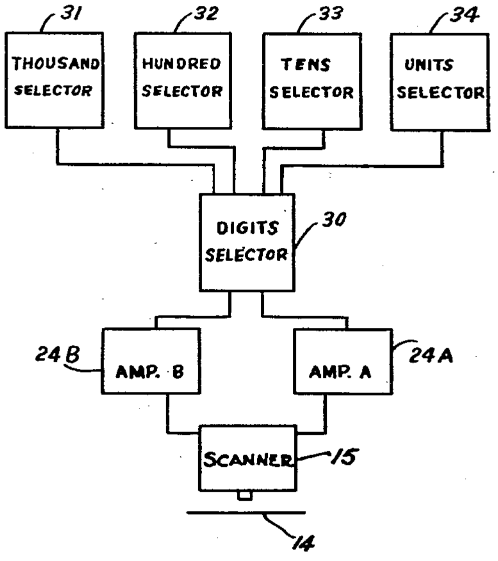
Fig. 2 is a block diagram illustrating the invention as applied to systems as shown in Fig. 1.

Fig. 2 is a block diagram illustrating a simplified form of apparatus for utilizing the invention. The signals from the scanner 15 are fed to the amplifier 24a and 24b. Here they may be amplified and converted into pulses, the duration of which is predetermined. Although I speak of the card as passing under the scanner, it will be appreciated that this is merely for clarity of explanation since the card could pass in any relation to the scanner, the only limitation being that the scanner and the card cooperate so that the intelligence is scanned.

The signals or pulses from the amplifiers are then fed into the digits selector 30. This may take the form of a stepping relay which is controlled by the amplifier 24b to direct the signals from the amplifier 24a to the proper digits counters as indicated at 31, 32, 33 and 34.

Figure 3:
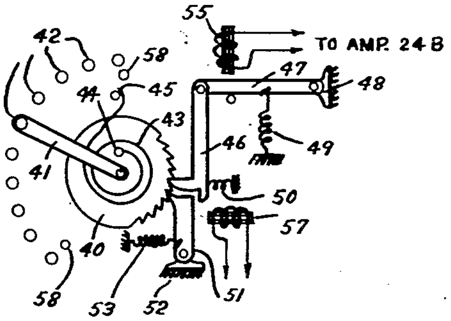
Fig. 3 is a schematic view of a stepping relay useful in connection with my invention.

For a better understanding of the operation of the digits selector, as well as the counters 31–34 inclusive, reference is had to Fig. 3 wherein there is diagrammatically illustrated a selector useful in my invention. As can be seen, it briefly comprises a stepping relay and includes a ratchet wheel 40 that is provided with a movable contact arm 41 adapted to be rotated sequentially into contact with the fixed contacts 42. A spiral spring 43 is provided connected to the ratchet wheel by a pin 44 and to a fixed support by a pin 45. The spring is arranged to rotate the ratchet wheel in a clockwise direction and the ratchet mechanism to rotate it in a counterclockwise direction.

The ratchet wheel is adapted to be advanced by a pawl 46 which is connected to an arm 47, one end of which is pivoted to a fixed support 48. A spring 49 urges the arm 47 downward and a spring 50 holds the pawl 46 into engagement with the ratchet wheel. A cooperating pawl 51 is provided being pivoted to a fixed support 52 and held in engagement with the ratchet wheel by a spring 53. This pawl holds the ratchet wheel against movement by the spring 43. The pawl 46 is raised upward upon energization of the coil winding 55 which magnetizes its associated core and attracts the lever 47 upward.

Each time the coil is energized, the pawl 46 moves the ratchet one tooth to cause the contact arm to be moved stepwise bringing it successively into contact with the contacts 42.

To reset the device, a reset coil 57 is provided which, when energized, withdraws the pawl 51 from engagement with the ratchet wheel. This pawl also engages the pawl 46 to withdraw it from the wheel, and the spring 43 rotates the wheel clockwise returning the arm 41 to the start position. Stops 58 limit the movement of the arm in both directions.

Such a stepping relay is provided for the digits selector 30. The amplifier 24b would be connected to the operating coil 55, and the amplifier 24a would be connected to the arm 41. In this instance, the first of the contacts 42, reading counterclockwise, would be open; the second contact would be connected to the thousands counter 31; the third contact would be unconnected; the fourth contact would be connected to the hundred selector; the fifth contact open; the sixth contact connected to the tens selector, etc.

The card 14 being passed through the scanner would first scan the line 10 in column B. This would cause an impulse in the amplifier 24b which would enegrize the coil 55 and the pawl 46 would move the ratchet wheel 40 and the switch arm 41 to the second contact, thus conditioning the circuit for transmitting impulse from the scanner amplifier 24a to the selector 31. Then as the lines in column A come under the scanner, the pulses from the amplifier 24a will be transferred by way of the arm 41 to the second contact, and thence to the thousands selector 31.

The selectors 31 to 34 can be of any conventional design, if preferred adapted to visibly indicate the number set up thereon. The pulses in the thousands group of column A will be recorded until the 6th line is reached. At this time, the line 11 in column B is also scanned, and the digits selector arm 41 is moved to the third contact, which, as previously stated, is unconnected. Therefore, the remaining marks in column A, although the pulses are generated, are ineffective. Subsequently, the second line of column B is scanned which then moves the digits selector to the next step, this being the fourth contact. Then, the card continuing under the scanner of column A again functions to record the digits in the hundreds selector 32 until it is locked out by the scanning of the mark 11.

The cards having passed through the scanner the number 6,543 will appear on the units 31 to 34 inclusive.

As previously stated, the system of my invention can be used to control an unlimited number of more highly complicated mechanical or electrical devices than that shown, the illustration and description being merely for showing a simplified form of apparatus that may be operated thereby.

It will be understood that the mechanism in the number selectors 31 to 34 inclusive may be of similar construction to the structure shown in Fig. 3. In this instance, however, the ratchet wheel 43 would not necessarily need the arm 41 but could have connected thereto a number wheel, the numbers of which would appear consecutively in the windows 29 of the housing 28. When the operation is completed, the digits selector may be returned to the start position by energizing the coil 57 whereupon the spring 43 rotates the arm 41 clockwise back to the start position. Likewise, when it is desired to clear the numbers from the counter mechanism, it can be cleared by moving the switch 27 which clears the counters in a similar manner.

Figure 5:
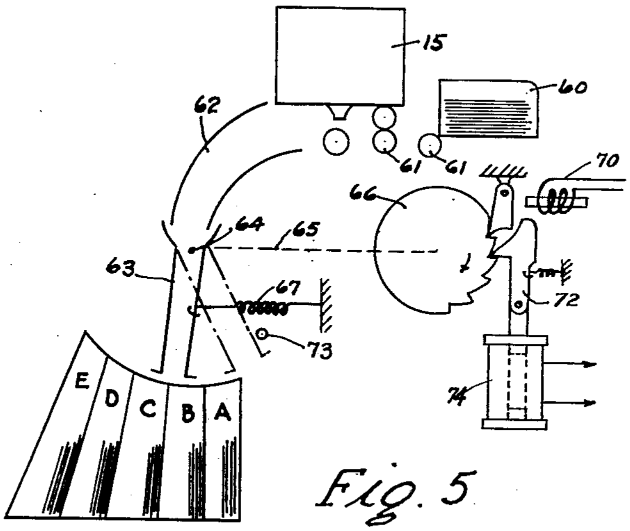
Fig. 5 is a diagrammatic view of another embodiment of my invention.

I have previously mentioned that the apparatus of my invention is also useful in connection with the sorting of cards or sheets. Such an apparatus is illustrated diagrammatically in Fig. 5.

The cards, checks, or papers to be sorted, having previously been provided with markings similar to that of Fig. 4, are stored in a bin or hopper 60. In this case, the total number of lines per group in column A will depend upon the number of classes into which the cards are to be sorted. The marking on the cards need not necessarily be indicative of numbers but could indicate zones, divisions or departments. The cards may be fed from the bottom of the hopper 60 by rollers 61 and passed under the scanner 15. From the scanner they drop into a chute 62 and thence to the movable throat 63. The throat 63 is swingable about a pivot 64 being controlled by a shaft 65 that is in turn rotated by the ratchet gear 66. A spring 67 biases the throat to a starting position where it normally rests. When a card passes under the scanner, the first mark in column B operates the reset solenoid 70 which attracts the pawl 71 from the ratchet wheel 66 and at the same time moves the ratchet pawl 72 from engagement therewith. The spring 67 then returns the throat to the start position indicated by the dotted lines, a stop 73 being provided to limit the movement. The next line in the B column which would be placed next to the reset line and would connect the circuit from amplifier 24a to the pawl operating solenoid 74. Then the number of marks in column B would be effective to pulse the solenoid 74 which, on each pulse, would move the ratchet wheel 66 and hence the throat 63 to the proper position opposite the bins A to E inclusive. The card would have a third mark in column B which would be placed as indicated in the previous description to lock the device in the proper position by moving the selector relay 30, after which the remaining marks, if any, would be ineffective.

The succeeding card would again reset the device, each card containing the intelligence which determined the bin into which the card would be dropped.

There is thus illustrated in a simplified manner how the apparatus of my invention can be used in other apparatus to assort cards or the like.

Figure 6:
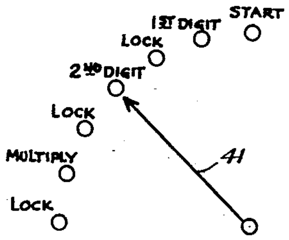
Fig. 6 is a schematic view illustrating another application of my invention.
Figure 7:
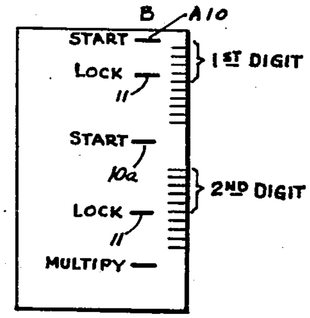
Fig. 7 is a view of a card useful in conjunction with the apparatus of Fig. 6.

It will be apparent, therefore, that my invention is such that it is extremely useful in conjunction with the control of many other forms of apparatus. It is particularly useful in conjunction with systems which are subject to manual operations such as has been described in conjunction with the marking of the card of Fig. 4, wherein the control marking is applied to control a sorting or computing operation. For instance, the apparatus could be made to control a computing system, wherein a multiplying operation could be performed by the proper marking. Figs. 6 and 7 are diagrams illustrating the principle of this operation. The selector switch, in this case, is illustrated only by the contact points and the switch arm, since the related apparatus is clearly shown in Fig. 3. The starting line 10 in column B when scanned would be effective to move the switch arm 41 to the first digit position, after which the digits would be counted by scanning the lines in column A, the desired number being locked by scanning line 11 in column B. Then the next line 10a would step the switch to control a setting up the second set of digits which would be the multiplier. After this is set up, it would be locked by line 11 and subsequently multiplied by the next movement of the selector switch. It will be appreciated from the foregoing that the scanning system lends itself to various other computing operations if desired.

Figure 8:
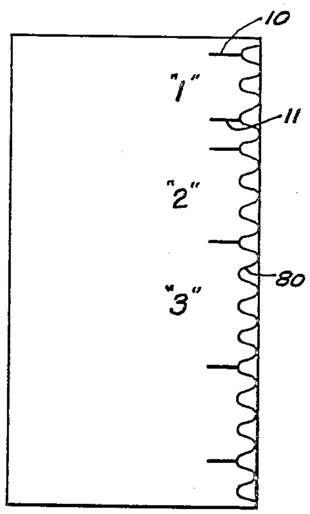
Figs. 8, 9, 10 and 11 are illustrative of different forms of cards which are useful in my invention.

It will also be seen that the apparatus is adaptable to various forms of cards. In Fig. 8 is shown a system which may be used in a bank to sort checks according to zones or branches. Here, if desired instead of the lines, the border of the check is provided with a line 80 in the form of a sine wave. If the number 123 were to be set up, the marks 10 and 11 would be extended from the 1st and 3d peaks causing the single intermediate peak to be counted and "1" to be set up; similar markings from the fourth and seventh peaks would set up "2." In this manner, the count would be of the peaks between the start and stop lines. The space between the sine wave line and the edge of the blank could be completely black if desired.

Figure 9:
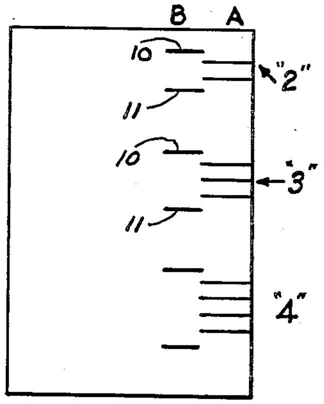

Fig. 9 illustrates the same principle, only the lines in column A replace the sine wave design and the lines in column B could be the start and stop lines.

Figure 10:
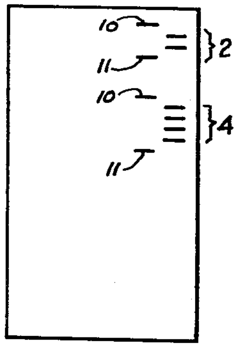

Fig. 10 illustrates a system where the control marks and the digits marks could be placed on the cards by a printing either at the time the cards are printed or by a machine especially designed to code the cards in the nature of a typewriter. In this case, if the figures 2 and 4 were desired, the marking could be placed on the card in some predetermined position and would include the same columnar arrangement but would only need the digits marks which were useful.

Figure 11:
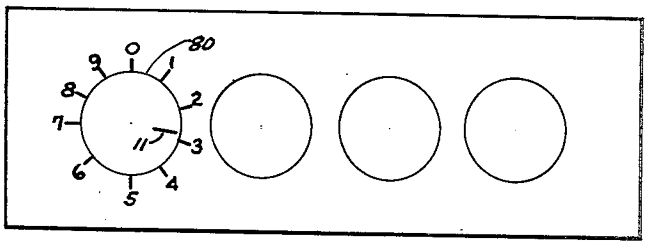

In Fig. 11, I have shown a card which is also useful in my invention. This card would be particularly adapted for the reading of gas, water or light meters. In this case, a replica of the meter dials could be printed on the cards. The meter reader would draw marks on the appropriate dials 80 to indicate the position of the meter hands. The scanner would of necessity be required to follow the circular path of the numbers 1 to 0. A start line would not be necessary, since the scanner would be arranged to automatically start at zero and stop at the desired stop mark. The operation in this case would be simplified by scanning all four dials simultaneously.

Although I have described more particularly the apparatus as comprising two photo-cells for scanning consecutively the groups of lines representing digits in column A under control of the lines in column B, it will be quite apparent from the preceding that all four of the groups, as shown in Fig. 4, could be scanned simultaneously by providing four sets of scanners, and that the markings could be disposed in any desired position.

It will also appear that column A for some purposes might be eliminated and only one cell used. In this case, it would be desirable to provide a series of impulses which could be applied in timed relation to the movement of the cards and the control impulse would be applied to the card by marking in the proper place, which could be indicated by figures opposite to which the line could be drawn. This interjects the problem of maintaining an exact position of the card on a carriage which is not present in the preferred embodiment. The digit impulses could be obtained by serrating the edge of the card and providing a member to follow the serrations, or the actual movement of the carriage holding the card could provide the impulses.

Figure 12:
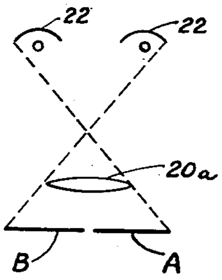
Fig. 12 is a diagrammatic view of a modified form of scanner.

Although I have shown two separate lens systems for the scanner, it is also possible to provide effective operations with one lens system as illustrated in Fig. 12. In this case, the lens 20a is arranged to provide an image of the lines in columns A and B into the two juxtaposed cells 22. Furthermore, although I have shown and described a system wherein reflected light is used, it will be apparent that the same results may be obtained with transmitted light providing the record stock has sufficient translucency to allow the passage of light therethrough.

Figure 13:
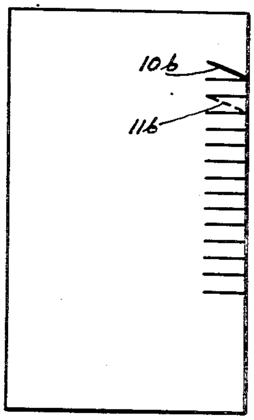
Fig. 13 is a view of a card.
Figure 14:
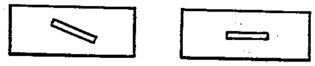
Fig. 14 is a view illustrating a modification of a scanning system for cooperation with the card of Fig. 13.

It is also possible to provide the desired marking in a single column should occasion arise. In Fig. 13, I have shown a card wherein the column A is the same as in Fig. 4, but column B has been eliminated. In this case, the marking corresponding to column B is placed in column A but is a diagonal marking instead of a straight line. The two scanning systems both look at the same column, but the mark in the one scanning system has its aperture inclined at a corresponding angle to that of the stop mark 11b on the card; hence, it will only be blocked out when the black lines having the same angle of inclination are scanned. The start mark 10a would also be included in the permanent marking.

This system has an advantage in that the operator need only connect the opposite ends of the lines of the permanent marks by a diagonal line to obtain the desired indication and also has the further advantage that it takes up considerably less space on a card or form.

It will thus be seen that I have provided a method and apparatus for the removal of intelligence from cards, records, checks or the like wherein the forms may be provided with a permanent coding to afford the desired operation or wherein the cards may be marked quickly and simply to enable subsequent selection, recording or computing operations. It has also been shown how the invention is applicable to various forms of systems and operates simply and effectively to afford the desired results.

Having thus described my invention, I am aware that numerous and extensive departures may be made therefrom without departing from the spirit or scope of my invention.

I claim:

1. The method of removing intelligence from a material containing intelligence which comprises scanning of a reference indicia and a control indicia, the scanning of said control indicia activating the scanning of the reference indicia to provide a series of reference impulses by the reference indicia, and the coincident scanning of the control indicia and reference indica locking the scanning of one of the reference impulses by a control impulse.

2. The method of removing intelligence from a record sheet or the like by scanning suitable independent series of markings of said record sheets by independent scanners which comprises scanning the record to generate a series of indicating impulses from one of the series of markings and generating controlling impulses in timed relation to the indicating impulses from the other marking to cause said control pulse to provide a control pulse ahead of the indicating pulse and a second control pulse coincidental with an indicating pulse to control the output of impulses generated by the indicating means.

3. The method of removing intelligence from a printed or written record which comprises providing said record with a plurality of indicating means and a control means, scanning said indicating means to provide a series of pulses and controlling the output of the scanners scanning the indicating means by a control means scanner to condition the indicating scanning means for removing the intelligence and accumulating intelligence and removing the intelligence upon coincident operation of the indicating and control means scanning.

4. An apparatus for scanning intelligence, from a record having a series of regularly occurring means for indicating intelligence and adapted to have a coincidence means placed thereon at a predetermined point to indicate said intelligence, comprising means operable by said regularly occurring means to provide a series of impulses and means operated by said coincidence means connected to control said first means to cause the transfer of the intelligence from the record by said first means and permit removal of the intelligence.

5. An apparatus for removing intelligence from a record having a row of markings at predetermined spaced intervals any of which may be extended into a second row, comprising means to scan the marks in the first row and a second means to scan the second row, said first means adapted to provide a series of impulses and said second means adapted to provide an impulse occurring concurrently with one of said first impulses and means operable by said concurrent impulses to perform an operation.

6. An apparatus of the class described including a light source adapted to illuminate a record, a first photo-electric cell for scanning one part of the record and a second photo-electric cell for scanning another part of the record, means including a stepping relay operated by said first cell, said second cell operable to lock said relay in upon a predetermined incident of operation of the second cell.

7. An apparatus of the class described comprising a scanning system including a first scanning unit for scanning a series of marks representing digits of a number system, a second scanning unit for scanning a mark coincidental to one of said digit marks, a registering means connected to said first scanner and operable thereby to record digits, said second scanner being connected to a stepping relay adapted to hold said register means at a predetermined number upon the scanning of a coincidental mark.

8. An apparatus of the class described comprising a scanner for scanning a series of lines representative of digits to form discrete impulses therefrom, a second scanner for scanning selected markings to indicate a selection of one or more of said series of lines for controlling the starting output of the first scanner and for stopping the output of the first scanner at a desired impulse representative of the desired digit.

9. An apparatus of the class described for use in combination with a record, said record having a series of columnar markings indicative of a sequential series of elements and adapted to have selecting markings placed thereon to indicate a selection of one or more of said series of markings, comprising scanning means for scanning said columnar markings and to generate electrical impulses therefrom, and a second scanning means for scanning said selecting markings and generate electrical impulses therefrom, and means operated by the impulses from said second scanning means to control the distribution of impulses from the first scanning means.

10. An apparatus for use in combination with a record sheet having markings disposed on one part of the sheet adapted for the selection of intelligence therefrom and arranged to be extended to a second part of the sheet for selecting the desired intelligence, comprising a light source for illuminating said sheet and a first photosensitive device for scanning said first markings and a second photosensitive device for scanning said extended markings, and amplifier means for each of said scanning devices for amplifying said changes in voltage due to the scanning means scanning the markings, a selector switch for operation by said second scanner connected to said second scanner through said amplifier means and counter means operable by said first scanner connected to said first scanner by said amplifier means and said selector switch.

11. An apparatus for use in combination with a record sheet having series of columnar markings in one column for indicating intelligence and a second column having starting lines in operative relation before each of said series of columns and said markings in said first column adapted to be extended into the second column to act as stopping lines to indicate the selected intelligence, comprising a scanner for scanning said sheet, when it is moved relative thereto, comprising a source of illumination, a first photosensitive scanner means in operative relation to the first column to generate impulses therefrom and a second photosensitive scanner means in operative relation to the second column to generate impulses from the second column, amplifier means for amplifying the impulses from each photosensitive means, a selector switch connected to the amplifier means for said second scanner and operable thereby and having selector contacts, a plurality of counter means, said selector switch having the selector contacts connected to said counter means and said first scanner being connected through said amplifier and said selector contacts to said counter means.

12. An apparatus for removing intelligence from a card or the like, which intelligence is represented by a plurality of lines on the card and arranged to have a control line placed thereon to indicate a selection of said intelligence comprising a first scanner for scanning said lines to generate impulses therefrom and a second scanner for scanning said control lines to generate an impulse connected to control the output of the first scanner.

JOHN A. VICTOREEN.

REFERENCES CITED

The following references are of record in the file of this patent:

UNITED STATES PATENTS

| Number | Name | Date |
|---|---|---|
| 2,000,403 | Maul | May 7, 1935 |
| 2,000,404 | Maul | May 7, 1935 |
| 2,010,653 | Warren | Aug. 6, 1935 |
| 2,079,429 | Tauschek | May 4, 1937 |
| 2,124,906 | Bryce | July 26, 1938 |
| 2,156,969 | Bryce | May 2, 1939 |
| 2,177,077 | Potts | Oct. 24, 1939 |
| 2,231,494 | Dickinson | Feb. 11, 1941 |
| 2,302,009 | Dickinson | Nov. 17, 1942 |
| 2,302,025 | Gould | Nov. 17, 1942 |
| 2,342,753 | Pearson et al. | Feb. 29, 1944 |